March 21, 1950     H. E. WIRTH     2,501,461
VALVE
Filed Aug. 28, 1945
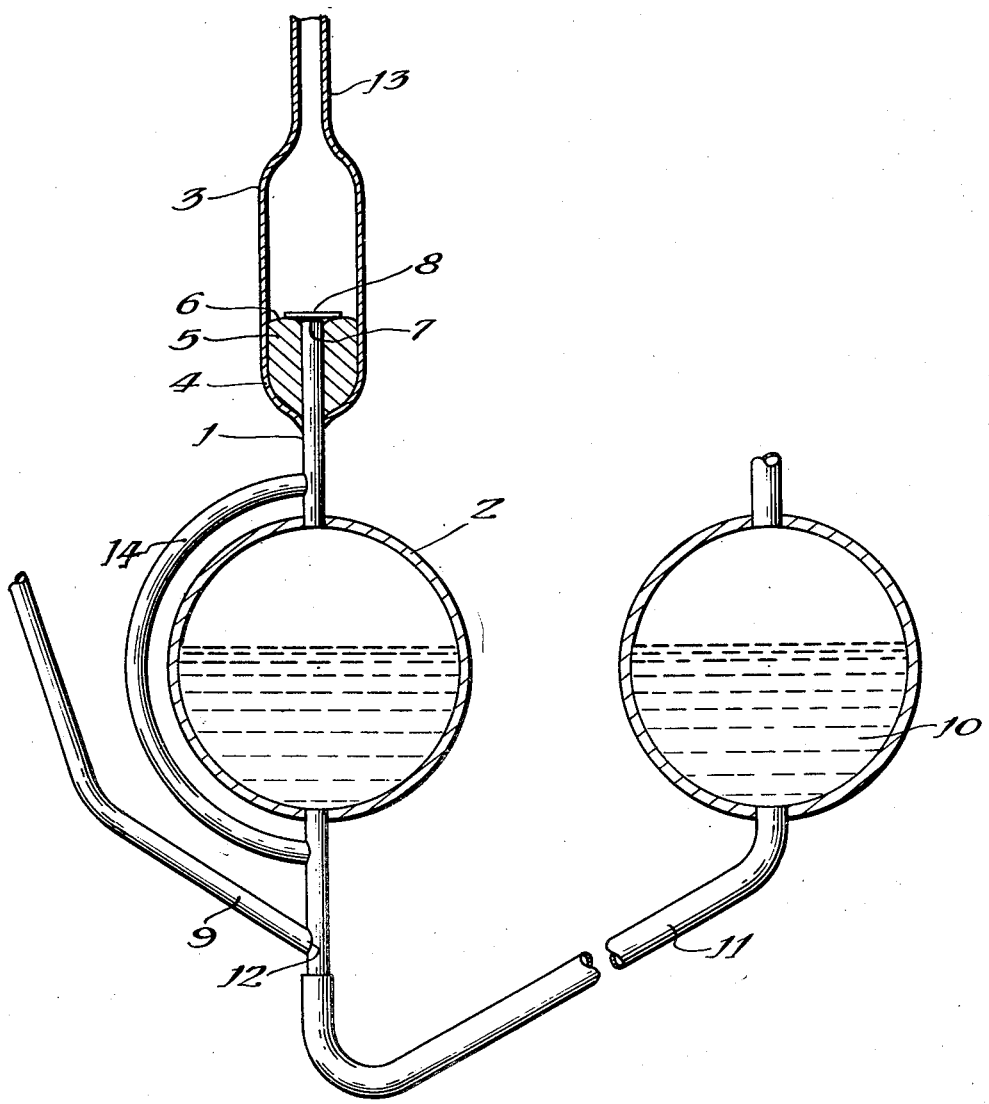
Witnesses:
Herbert E Metcalf
Albert F. Bower
Inventor:
Henry E. Wirth
By: Robert A. Lavender
Attorney Patented Mar. 21, 1950

2,501,461

UNITED STATES PATENT OFFICE 2,501,461

VALVE

Henry E. Wirth, Worthington, Ohio, assignor, by mesne assignments, to the United States of America as represented by the United States Atomic Energy Commission Application August 28, 1945, Serial No. 613,157

5 Claims. (Cl. 251—127)

This invention relates to valves and more particularly to valves that permit a flow in one direction only.

Apparatus for permitting a flow in one direction only generally employ an involved mechanism or have parts which are subject to wear.

It is an object of this invention to provide a simple valve for permitting the passage of gases or fluids through a conduit in one direction only.

It is a further object of this invention to provide a simple positive-acting valve which is subjected to a minimum of wear.

It is another object of this invention to provide a valve that falls into place under gravity to close the valve passage and is opened by the pressure of the unidirectional flow.

These and other features of the invention contributing to its simplicity of construction and dependability in operation will be apparent from the following detailed description of a preferred embodiment taken with the accompanying drawings in which the single figure is an elevational view in section showing my valve in an evacuating system.

In general, the valve of this invention comprises a glass system composed of a conduit entering a vertically disposed chamber which is provided with a wafer resting on a ring which encircles the end of the conduit in the chamber. The ring is positioned flush with or slightly above the end of the conduit and provides an airtight seal with the wall of the chamber so that the wafer resting on the ring plugs the backward passage of gas or fluid from the chamber above the wafer through the conduit.

The drawing illustrates a glass filling and evacuating apparatus comprising a vertically disposed conduit 1 connecting a bulb 2 and a chamber 3. The conduit 1 is fused to both the bulb 2 and the chamber 3 and extends into the chamber 3 a sufficient distance to form a cavity 4 with the walls of chamber 3. The cavity 4 is filled with mercury which settles in a pool 5 around the vertical disposed conduit 1. Mercury is filled into chamber 3 until the surface 6 projects slightly above the end 7 of the conduit 1.

The non-wetting characteristic of mercury on glass forms the surface 6 into a convex meniscus which provides the raised portion of surface 6 above the free end 7 of conduit 1 so that a disk 8 placed on the surface 6 will be raised slightly above the end 7 of conduit 1. The disk 8 resting on the mercury pool 5 creates a seal which prevents a gaseous flow from the upper part of chamber 3 into the conduit 1.

Referring now to the operation of my valve in a gas system as shown in the drawing, a gas entering the system through a tube 9 is passed through the bulb 2 and chamber 3 by filling the bulb 2 with mercury from a flask 10 by raising flask 10, after the bulb 2 has been filled with gas from the tube 9 with the flask 10 lowered. The flask 10 which is filled with mercury and attached to a nipple on the bottom of bulb 2 by a rubber tube 11 may be raised above and lowered below bulb 2. Gas from tube 9 is passed into bulb 2 by holding flask 10 below bulb 2 to drain the mercury from bulb 2 to a level below the inlet 12 of tube 9. To evacuate the gas from bulb 2 the flask 10 is raised above the bulb 2 so as to pass the mercury through the tube 11 and raise the mercury level above the tube inlet 12 and fill bulb 2 with mercury. The mercury rising into bulb 2 forces the gas from bulb 2 up through the conduit 1. This evacuated gas raises the disk 8 and escapes into the chamber 3 and thence out through the vent 13.

When the gas has been completely evacuated from the bulb 2 by the mercury, the flask 10 is lowered below the bulb 2 and the mercury descending into flask 10 leaves a lowered pressure in bulb 2. The disk 8 now seated on the mercury 5, prevents backward flow of the evacuated gas from the chamber 2 into the conduit 1. When the mercury clears the inlet 12 the gas in tube 9 is drawn into the bulb 2 by the lowered pressure and the procedure is repeated. Any suitable mechanism may be provided for raising and lowering the flask 10. A by-pass tube 14 around the bulb 2 prevents the bulb 2 from being broken by violent uprushes of gas from tube 9 as the mercury descends from the bulb 2.

The level of the mercury pool may be slightly varied so that the disk 8 may either be seated on the end 7 or raised slightly off conduit 1. In either case the seal is made by the disk 8 resting on the mercury pool 5 ringing the conduit 1. The surface of end 7 is plane ground so that when the disk 8 contacts end 7 a tight seal is provided against the passage of gases from the chamber 3 back into the conduit 1.

It will be apparent to those skilled in the art that various modifications can be made without departing from the spirit of the invention as disclosed herein, and for that reason it is not intended that it should be limited other than by the scope of the appended claims.

What is claimed is:

1. A valve comprising a conduit extending upwardly into a chamber, an annular ring of liquid surrounding the protruding end of said conduit, and a flat wafer resting on said liquid ring to seal the opening in said conduit from said chamber.

2. A valve comprising a conduit extending upwardly into a chamber, a pool of mercury surrounding the portion of said conduit extending into said chamber and a flat wafer resting on said pool of mercury to seal the open end of said conduit from said chamber.

3. Valve apparatus comprising a glass chamber, a glass conduit sealed to said chamber and extending upwardly into said chamber, a pool of mercury within said chamber surrounding said conduit, and a flat wafer resting on said pool of mercury, whereby said wafer is raised by pressure in the conduit.

4. Valve apparatus comprising, in combination: a chamber; a conduit protruding upwardly through the bottom of the chamber and having an upper end within the chamber spaced from the side walls thereof; a liquid filling the space between the conduit and the side walls and having an upper level coinciding at the conduit with the upper end of the conduit to form an annular liquid meniscus above the level of the end of the conduit; and a flat wafer resting on the liquid meniscus.

5. The apparatus of claim 4, wherein the chamber and the conduit are glass and the liquid is mercury.

HENRY E. WIRTH.

REFERENCES CITED

The following references are of record in the file of this patent:

UNITED STATES PATENTS

| Number | Name | Date |
|---|---|---|
| 1,871,943 | Atwell | Aug. 16, 1932 |
| 2,267,594 | Lowry | Dec. 23, 1941 |
| 2,384,147 | Wiggins | Sept. 4, 1945 |

FOREIGN PATENTS

| Number | Country | Date |
|---|---|---|
| 223,122 | Great Britain | Oct. 16, 1924 |